United States Patent
Ohno et al.

[15] 3,665,286
[45] May 23, 1972

[54] DIRECT CURRENT POWER CONTROL SYSTEM

[72] Inventors: Ellichi Ohno; Masahiko Akamatsu, both of Amagasaki, Japan

[73] Assignee: Mitsubishi Denki Kabushiki Kaisha, Tokyo, Japan

[22] Filed: Sept. 29, 1970

[21] Appl. No.: 76,442

[52] U.S. Cl. ..................321/2, 318/341, 318/345, 321/43, 321/45 C, 323/22 SC, 323/25
[51] Int. Cl. .......................................................H02m 3/32
[58] Field of Search ...............318/317, 341, 345; 321/2, 43, 321/44, 45 C; 323/22 SC, 23, 25, 38

[56] References Cited

UNITED STATES PATENTS

| 3,399,336 | 8/1968 | Koppelmann | 321/45 C |
| 3,325,720 | 6/1967 | Stumpe | 321/45 C |
| 3,213,287 | 10/1965 | King | 321/45 C |
| 3,496,444 | 2/1970 | King et al. | 321/43 X |
| 3,504,266 | 3/1970 | Schlabach et al. | 321/45 C |

OTHER PUBLICATIONS

Menard & Cielo, " Switch Voltage Regulator," IBM Technical Disclosure Bulletin, Vol. 6 No. 8 Jan. 1964, pgs. 31, 32.

Primary Examiner—A. D. Pellinen
Attorney—Robert E. Burns and Emmanuel J. Lobato

[57] ABSTRACT

Plural main thyristors are connected in parallel between a dc source and a load and successively fired to electrically interconnect them. A pulse generator including a capacitor charged from the source and a thyristor for inverting a charge on the capacitor is connected across the main thyristors through individual distribution thyristors fired at predetermined time intervals to supply a discharge current from the capacitor to the associated main thyristors to render them nonconducting. After each discharge, the capacitor is again charged from the source and inverted in polarity. The power supply to the load is controlled by varying the starting times of the main thyristors.

11 Claims, 12 Drawing Figures

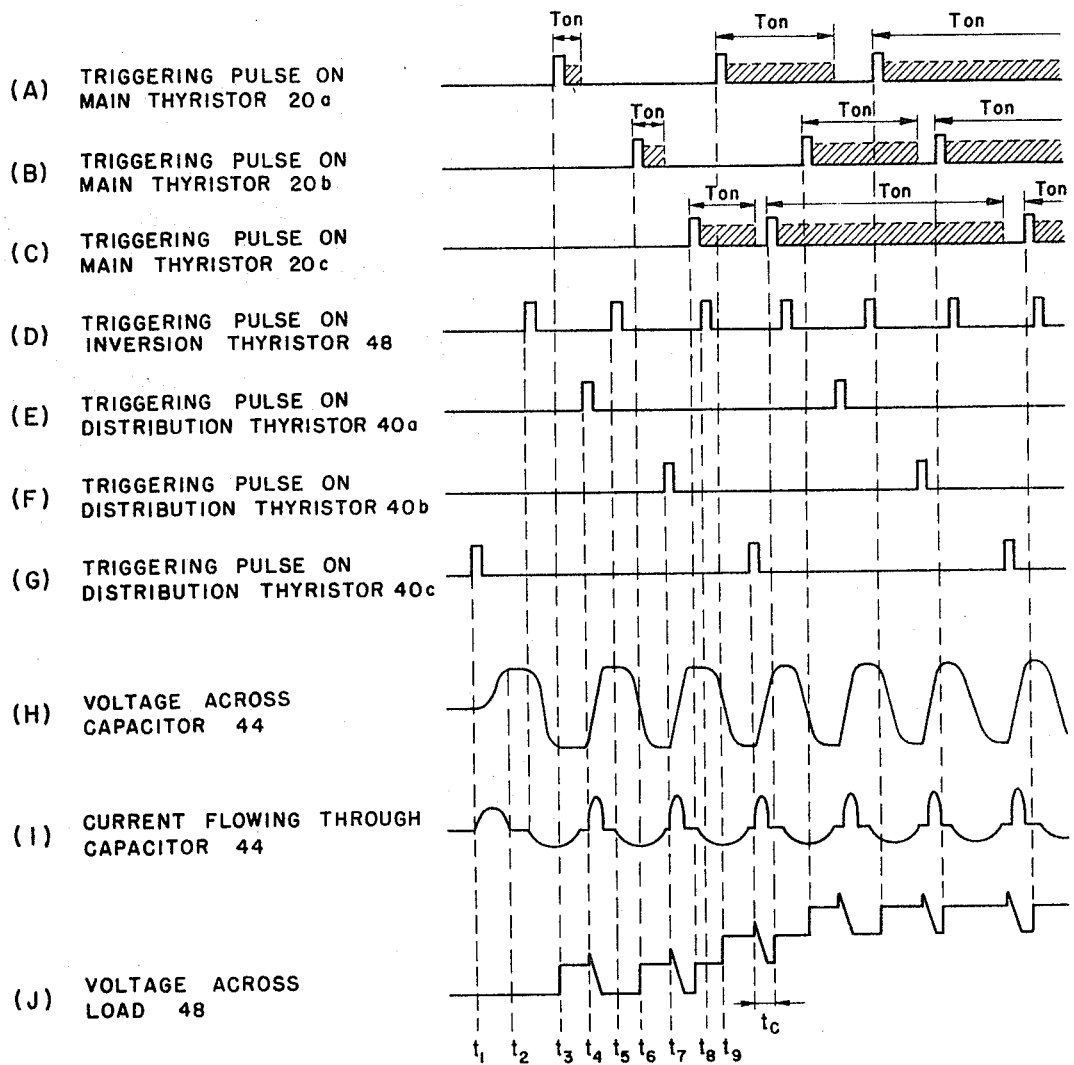
FIG. 4
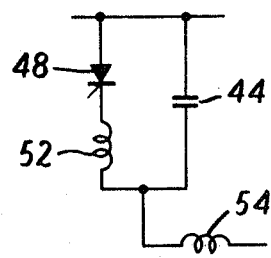
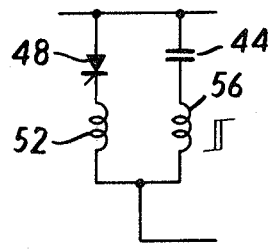
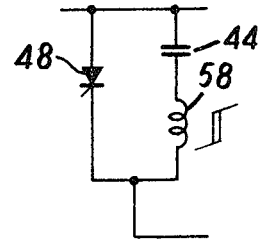
FIG. 5a   FIG. 5b   FIG. 5c

DIRECT CURRENT POWER CONTROL SYSTEM

BACKGROUND OF THE INVENTION

This invention relates to a system current (dc) controlling direct current power operative on the basis of the principles of the polyphase chopper system including a plurality of thyristors for controlling a direct current motor or the like.

In general, thyristor type direct current (dc) choppers comprise the thyristor used, as a power switch, to turn on and off a power supplied by the associated source of direct current so that a ratio of "ON"-to-"OFF" time is changed to control the mean dc power supplied to the particular load. Such choppers can control the dc power supplied to the load in continuous manner without any electric contact being used and therefore are widely used to control direct current equipments and more particularly dc motors. Especially the use of the abovementioned thyristor type choppers in controlling electric vehicles or locomotives has completely changed their control system and given many advantages. Upon putting such choppers to practical use, a problem has been encountered in conjunction with the inductive interference with the adjacent communication lines. This is because a current flowing through the associated trolley wire includes high harmonic components. In order to effectively solve that problem, polyphase dc chopper systems have been adopted. Such chopper systems presently employed have been disadvantageous in that there are necessarily disposed commutation thyristors, commutation diodes, commutation reactors and commutation capacitors, one component for each chopper unit and that even if it is attempted to minimize the dc power supplied to the associated load by minimizing the firing angle of the chopper unit in each phase, the output can not be rendered substantially null, for the reason that a voltage across the commutation capacitor is forced to be inverted in polarity for a finite time.

SUMMARY OF THE INVENTION

Accordingly it is an object of the invention to provide a dc power control system using a new and improved thyristor type polyphase chopper.

It is another object of the invention to provide a new and improved dc power control system including a commutation circuit having a minimum number of components.

It is still another object of the invention to provide a new and improved dc power control system capable of extremely decreasing a minimum possible output voltage.

It is a further object of the invention to provide a new and improved dc power control system including voltage commutation thyristors lightened in firing and current duties and thyristors for distributing commutation pulses also lightened in arc extinguishing duty.

It is still another object of the invention to provide a new and improved dc power control system high in operative frequency for a minimum possible output voltage equal to that provided by the prior art type systems thereby to render filter means on the input and output sides small-sized and light.

The invention accomplishes the aforesaid objects by the provision of a direct current power control system comprising a plurality of main thyristors connected in parallel circuit relationship in an electric path connecting a source of direct current to a load and controlled in conduction in a predetermined phase relationship to be operative in their conducting state to supply the load current from the source to the load, characterized by one pulse distribution thyristor connected to each of the main thyristors, and a common pulse generator unit for generating a commutation pulse, the pulse generator unit being connected across the plurality of main thyristors through the pulse distribution thyristors to supply the commutation pulse to a selected one of the main thyristors through the associated distribution thyristor.

The pulse generator unit may preferably include a commutation capacitor, a voltage inversion thyristor disposed in parallel circuit relationship with respect to the commutation capacitor to invert the polarity of a voltage charged on the commutation capacitor, and a commutation reactor connected in series circuit relationship with at least one of the thyristor and capacitor.

BRIEF DESCRIPTION OF THE DRAWINGS

This invention will become more readily apparent from the following detailed description taken in conjunction with the accompanying drawings in which:

FIG. 4 is a graph illustrating waveforms developed at various point on the circuit shown in FIG. 3; and FIGS. 5a through c and FIGS. 6a through e show different modifications of the generator circuit illustrated in FIG. 3.

DESCRIPTION OF THE PREFERRED EMBODIMENTS

Figure 1:
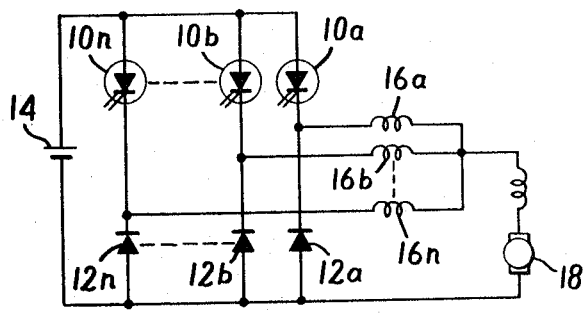
FIG. 1 is a fragmental circuit diagram of a dc power control system of polyphase dc chopper type constructed in accordance with the principles of the prior art.

Referring now to FIG. 1 of the drawings, there is illustrated a conventional thyristor type dc chopper. The arrangement illustrated comprises a plurality of chopper units 10a, b, . . . n, one flywheel diode 12a, b, . . . or n connected in opposite series circuit relationship with each of the chopper units and a source of direct current 14 connected at the positive terminal to the anode side of all the chopper units 10 and at the negative terminal to the anode side of all the flywheel diodes 12. The junction of the chopper unit 10 and the diode 12 is connected through an individual smoothing reactor 16 to a common load 18 including a reactance such as an electric motor to be controlled with the load 18 returned to the negative terminal of the source 14. For example, the junction of the chopper unit 10b and the flywheel diode 12b is connected through the smoothing reactor 16b to the load 18.

Figure 2:
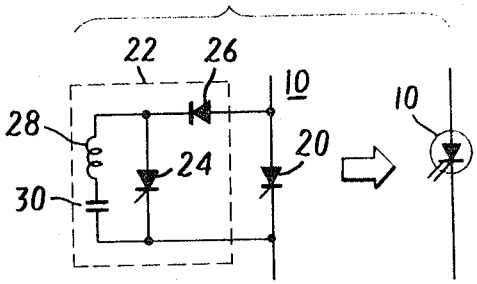
FIG. 2 is a circuit diagram of the chopper unit for each phase illustrated in FIG. 1 and the symbol therefor.

The chopper unit 10a, b, . . . or n has been generally constructed into a circuit configuration such as shown in FIG. 2. In FIG. 2, the chopper unit generally designated by the reference numeral 10 includes a main thyristor 20 and a commutation circuit generally designated by the reference numeral 22 connected across the main thyristor 20. The commutation circuit 22 comprises a commutation thyristor 24 including a cathode electrode connected to that of the main thyristor 20, a commutation diode 26 connected across the anode electrodes of both thyristors, and a series combination of a commutation reactor 28 and a commutation capacitor 30 connected across the commutation thyristor 24. The chopper unit 10 as above described may be denoted by the symbol shown on the righthand portion in FIG. 2.

Assuming that the number of phases is equal to n, the chopper units 10a, b, . . . n are successively turned ON and OFF in such phase relationship that one operating cycle of the system is divided into n equal portions. Under these circumstances, the conduction time of the chopper unit 10a, b, . . . . or n for each phase can change to control the power supplied to the load 18. As the power supply to the load increases, the number of the chopper units simultaneously put in its conducting state increases.

Since the chopper units 10 are of the same construction, the chopper unit 10a will now be described in more detail with reference to FIGS. 1 and 2. With the main thyristor 20 in its nonconducting state, the commutation capacitor 30 charges from the source 14 through the commutation diode 26, the commutation reactor 28, the smoothing reactor 16a and the load 28 until it has charged thereon a voltage having a polarity illustrated in FIG. 2. Even if the main thyristor is put in its conducting state, that polarity is retained because of a high reverse resistance provided by the diode 26.

A positive potential is applied to the gate electrode of the commutation thyristor 24 to make it conduct whereupon the series combination of the commutation reactor and capacitor 28 and 30 respectively is shortcircuited by the now nonducting thyristor 24. Then the capacitor 30 is inverted in polarity of the charged voltage to put the commutation thyristor 24 and further the main thyristor 20 in their nonconducting state. Thus the system is returned back to its original state after which the process as above described is repeated to again charge the commutation capacitor 30 with the polarity illustrated.

That process is also repeated with each of the remaining chopper units 10b, . . . n so that all the chopper units are successively turned ON and OFF during a time interval corresponding to one cycle of the system divided by the number of phases or n.

From the foregoing it will be seen that the chopper unit 10 for each phase is required to include one commutation thyristor 24, one commutation diode 26, one commutation reactor 28 and one commutation capacitor 30. Further if it is attempted to minimize the dc power supplied to the load by minimizing the firing angle of the chopper unit for each phase, the resulting output can not be substantially null because the commutation capacitor is forced to be inversed in the polarity of the charged voltage for a finite time.

The invention contemplates to eliminate the disadvantages of the conventional system as above described.

Figure 3:
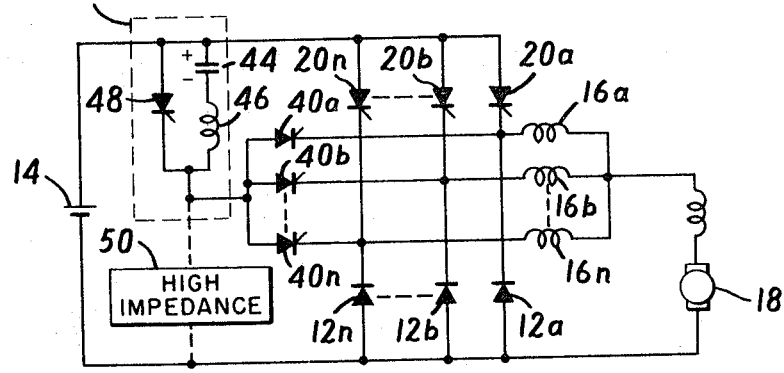
FIG. 3 is a fragmental circuit diagram of a dc power control system constructed in accordance with the principles of the invention.

Referring now to FIG. 3 wherein like reference numerals designate the components identical or corresponding to those shown in FIGS. 1 and 2, there is illustrated one embodiment of the invention. The arrangement illustrated comprises a plurality of main thyristors 20a, b, . . . n, a plurality of flywheel diodes 12a, b, . . . n, a plurality of smoothing reactors 16a, b, . . . n, a single load 18 including a reactance, and a source of direct current 14 interconnected in the manner as previously described in conjunction with FIG. 1 except for the main thyristors replacing the choppers.

According to the principles of the invention, the junction of each main thyristor 20 and the associated flywheel diode 12 is also connected to a cathode electrode of individual distribution thyristor 40a, b, . . . or n for distributing a commutation pulse for each phase. Further a commutation circuit generally designated by the reference numeral 42 and comprising a pulse generating circuit is connected between the positive terminal of the source 14 and the anode electrodes of all the distribution thyristors 40 a, b, . . . n. The commutation circuit 42 includes a series combination of a commutation capacitor 44 and a commutation reactor 46 forming a series resonance circuit and a voltage inversion thyristor 48 connected across the capacitor and reactor combination 44–46 with the anode electrode of the thyristor 48 connected to the positive terminal of the source 14. If desired, an auxiliary charging impedance 50 may be connected between the negative terminal of the source 14 and the common junction of the anode electrodes of the distribution thyristors 40a, b, . . . n.

The operation of the arrangement as shown in FIG. 3 will now be described in conjunction with FIG. 4 wherein there are illustrated waveforms developed at various point thereon and on the assumption that the arrangement is of a three phase system. As shown in FIG. 4, a triggering pulse with a waveform G from a ring counter (not shown) for example is applied to the gate electrode of the distribution thyristor 40c for the last phase or c phase at a time point of $t_1$ to fire it. This causes the commutation capacitor 44 to charge to a voltage $E_s$ across the source 14 as shown at waveform H in FIG. 4 until the distribution thyristor 40c is automatically turned OFF. Then at a time point of $t_2$, a waveform D is applied to the inversion thyristor 48 to fire it thereby to complete a closed circuit including the commutation capacitor 44, the inversion thyristor 48, and the commutation reactor 46. Therefore the voltage across the capacitor 44 is inverted in polarity until it has a voltage of $-E_s$ charged thereon (see waveform H). That is, the voltage across the capacitor 44 is equal and opposite to the source voltage. At that time, the inversion thyristor 48 is reversely biased with the inversed voltage $-E_s$ on the capacitor 44 and the system has completed the starting process and is now ready for operation.

As shown at waveform A in FIG. 4, a triggering pulse is applied to the main thyristor 20a for the phase a at a time point of $t_3$ to fire it. Therefore a current from the source 14 flows through the now conducting main thyristor 20 a, and the smoothing reactor 16a into the load 18. The resulting voltage across the load 18 is shown at waveform J is FIG. 4. Then at a time point of $t_4$ when the conduction time $T_{on}$ of the main thyristor 20a is to end, the distribution thyristor 40a is fired with a first one of waveforms E as shown in FIG. 4. The conduction time $T_{on}$ of each main thyristor 20 is shown in FIG. 4 as beginning at the leading edge of the associated firing pulse and terminating at the tailing edge of a hatched zone following it. Thus the voltage across the commutation capacitor 44 previously charged and inverted in polarity to have a magnitude of $-E_s$ is applied, as a reverse voltage, to the main thyristor 20a to render it nonconducting. Following this, the charge corresponding to the voltage of $-E_s$ across the capacitor discharges through the commutation reactor 46, the distribution thyristor 40a, the smoothing reactor 16a and the load 18. Thereafter the capacitor 44 again charges to the original voltage of $+E_s$ from the source. Then the distribution thyristor 40a is automatically turned OFF.

Then at a time point of $t_5$, the inversion thyristor 48 is fired with a second one of waveforms D to invert the voltage across the commutation capacitor 44 in the similar manner as above described in conjunction with the starting process of the system. That is, the capacitor 44 has a voltage of $-E_s$ charged thereon and therefore the system is now ready for the succeeding phase of the commutation.

For the succeeding phase b, the main thyristor 20b is put in its conducting state at a time point of $t_6$ and then the distribution thyristor 40b is fired at a time point of $t_7$ followed by the firing of the inversion thyristor 48 at a time point of $t_8$ as shown at waveforms B, F and D in FIG. 4. Thus the similar process as above described for the phase a is repeated to supply a load current from the source 14 to the load 18, after which the system is ready for the commutation in the phase c.

For the phase c, waveforms C, G and D are applied to the associated thyristors 10c, 40c and 48 to supply a load current from the source 14 to the load 18.

Then the second commutation cycle is started at a time point $t_9$. Namely the main thyristor 20a for the phase a is again fired at that time to repeat the process as above described.

In FIG. 4 waveform I describes currents successively flowing through the commutation capacitor 44. With the impedance 50 connected to the commutation circuit, it scarcely affects the inversion of the polarity of voltage across the capacitor 44 because it has a high magnitude.

It will readily be appreciated that the output supplied to the load 18 is determined by the conduction time $T_{on}$ of each of the main thyristors 20. As shown in FIG. 4, the time points when the main thyristors 20 are put in their nonconducting state are determined by the associated distribution thyristors 40 adapted to be successively fired at predetermined equal time intervals in the order of the phases a, b and c. On the other hand, the main thyristors 20 are fired at time points determined by the positions along the time axis of the associated triggering pulses applied thereto. Therefore the conduction time $T_{on}$ of each main thyristor can be adjusted by a time interval by which the triggering pulse applied to that main thyristor 20 will lead in front of the firing pulse applied to the associated distribution thyristor 40 for the purpose of controlling the output.

On the other hand, with each of the main thyristors 20 fired at its fixed time point, the conduction time $T_{on}$ thereof may be adjusted by changing a time point when the associated distribution thyristor 40 is fired, with respect to that fixed time point. This measure leads to the necessity of varying the firing time point of the inversion thyristor 48 through a change in firing time point of the distribution thyristor 40 while a predetermined phase relationship is held therebetween. In addition, the time point when the main thyristor is to be put in its nonconducting state is required to be rapidly changed for the purpose of effectively controlling the conduction time thereof. Under these circumstance, the control of the conduction time while maintaining the predetermined phase relationship as above described causes not only a decrease in response of the system but also it lacks in accuracy as well as requiring a complicated control circuit.

On the contrary, the first-mentioned means whereby the main thyristors each are fixed in turn-off time point but have a variable time point when it is fired can eliminate the disadvantages of the last-mentioned measure to exhibit a good control behavior.

In order to supply a mean minimum possible output to the load, firing pulses can be simultaneously applied to the main thyristor and the associated distribution thyristor for each phase to render the conduction time equal to zero.

As shown at waveform J in FIG. 4 a voltage across the load 18 that is, the output applied thereto from the main thyristor can increase by increasing the number of the main thyristors simultaneously put in their conducting state.

Also with all the main thyristors maintained conducting in overlapped relationship and immediately after the distribution thyristor for each phase has been fired, the associated main thyristor can be fired to provide a mean maximum possible output. In this case, it is required to dispose between the firing of both thyristors a time interval required to cause the commutation capacitor 44 to be again charged with the polarity illustrated in FIG. 3, as shown at a time interval of $t_c$ in FIG. 4.

The pulse generating circuit 42 as previously described may be differently modified as shown in FIGS. 5 and 6 wherein like reference numerals designate the components identical to those shown in FIG. 3.

In FIG. 5a, the commutation capacitor 44 is connected across a series combination of the commutation thyristor 48 and a reactor 52 while the junction of the reactor 52 and capacitor 44 is connected to another reactor 54. The reactor 54 is adapted to be connected to the anode electrodes of all the distribution thyristors 40 (not shown in FIG. 5a). Both reactors 52 and 54 correspond to the commutation reactor 46 as shown in FIG. 3. The reactor 52 is chosen to be higher in inductance than the reactor 46 while the reactor 54 is chosen to be lower in inductance than the reactor 46.

The reactor 52 having the higher inductance serves to decrease the magnitude of a current flowing through the inversion thyristor 48 when the voltage across the capacitor 44 is being inverted in polarity. This causes a reduction in pulse duty of the inversion thyristor 48. Also upon putting the particular main thyristor in its nonconducting state, the commutation capacitor 44 inverted in polarity supplies a current through the reactor 54 having the lower inductance whereby a commutation overlapping period is shortened. This causes a decrease in recharging time (which is designated by the reference characters $t_c$ in FIG. 4) for the capacitor 44 permitting the use of a higher operative frequency because of a decrease in time delay resulting from the lower inductance. It will be apparent that with higher operative frequency used, filters on the input and output sides can decrease in both size and weight.

In FIG. 5b the commutation capacitor 44 is connected across a series combination of a thyristor 48 and reactor 52 through a saturable reactor 56 with the reactor 54 omitted. The effect that the reactor 56 decreases a current flowing through the thyristor 48 during the inversion of the voltage across the capacitor 44 is increased only immediately after the inversion thyristor 48 has been turned on. This permits the suppression of a sharp rise (di/dt) of a current flowing through the capacitor 44 immediately after the turning-on of the main thyristor.

Also the saturable reactor 56 is designed and constructed to be immediately saturated. Therefore, upon turning off one of the main conducting thyristor 20 by the associated distribution thyristor 40, the capacitor 44 is permitted to discharge through a low impedance path. Thus the recharging time for the capacitor 44 can be shortened resulting in a higher operative frequency as in the arrangement of FIG. 5a.

In FIG. 5c, the saturable reactor 56 is replaced by a linear reactor 58 with the reactor 52 omitted. In other respects, the arrangement is identical to that shown in FIG. 5b. The reactor 58 are designed and constructed to perform the operations of the reactor 46 and 56 as shown in FIGS. 3 and 5b respectively.

FIG. 6 shows various arrangements for preventing the commutation capacitor 44 from increasing in recharging time due to a load current under light loadings. To this end, the pulse generating circuit 42 has connected thereacross a recharging circuit for increasing a rate at which the capacitor 44 again charges.

Figure 6A:
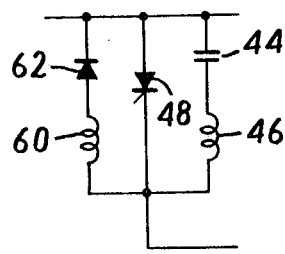

In FIG. 6a the recharging circuit is formed of a reactor 60 and a semiconductor diode 62 serially connected thereto and it is connected across the circuit 42 as shown in FIG. 3 with the diode 62 of opposite polarity to the thyristor 48. Upon firing one of the distribution thyristors, the capacitor 44 inverted in polarity causes a reversely biasing current to flow through the associated main thyristor to bring it into its nonconducting state. Therefore that current flows through a current path including the associated smoothing reactor 16, the load 18, the source 14 and the capacitor 44 as shown in FIG. 3 until the capacitor is recharged. With the load low, the current is also low resulting in a useless increase in the recharging time for the capacitor 44.

In the arrangement of FIG. 6a the current is caused, in addition to the abovementioned current path, to flow through a current path including the capacitor 44, the reactor 46, the reactor 60 and the diode 62 to be abruptly oscillated and inverted thereby to increase the recharging rate. It is noted that the recharging time must decrease to such an extent that there remains a minimum time interval for which the main thyristor is required to be maintained reversely biased.

Figure 6B:
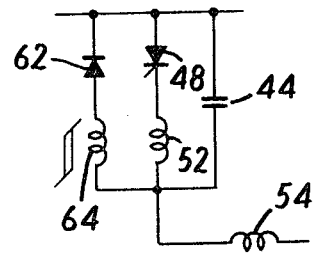

FIG. 6b shows a series combination of a semiconductor diode 62 and a linear reactors 64 connected across the arrangement as shown in FIG. 5a with the diode 62 opposite in polarity to the thyristor 48. A time required to saturate the reactor 64 is utilized to delay a time at which the discharge circuit for the capacitor 44 is started.

Figure 6C:
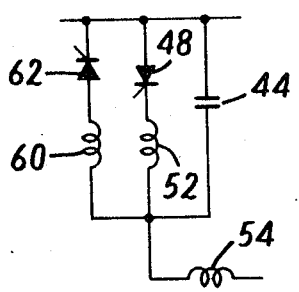

In FIG. 6c, a series combination of a reactor 60 and a recharging thyristor 62 is connected across the arrangement of FIG. 5a and opposite in polarity to the thyristor 48. The firing time of the thyristor 66 is utilized to attain the purpose similar to that of the arrangement as shown in FIG. 6b.

Figure 6D:
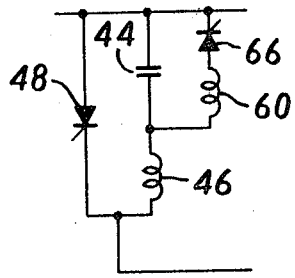

In FIG. 6d, the recharging circuit 60–66 as shown in FIG. 6c is connected across the capacitor 44 in the circuit 42 as shown in FIG. 3.

Figure 6E:
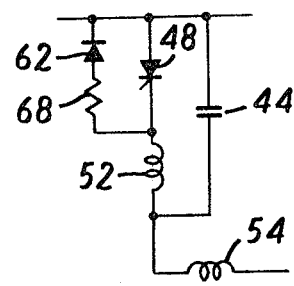

In FIG. 6e a series combination of a semiconductor diode 62 and a resistor 68 is connected across the inversion thyristor 48 with the diode 62 opposite in polarity to the thyristor 48. The resistor 68 performs the operation of the reactor 60 as shown in FIG. 6c and also serves to apply a reverse voltage to the thyristor 48.

What we claim is:

1. A direct current power control system comprising, in combination,
   a. a source of direct current,
   b. a load,
   c. a plurality of main thyristors connected in parallel circuit relationship in an electric path connecting said source to said load, and controlled in conduction in a predetermined phase relationship to be operative in their conducting state to supply the load current from said source to said load therethrough;
   d. one pulse distribution thyristor connected to each of said main thyristors,
   e. a common pulse generator unit for generating a commutation pulse, said pulse generator unit being connected across said plurality of main thyristors through said pulse distribution thyristors to supply a commutation pulse to a selected one of said main thyristors through the associated distribution thyristor, and f. said pulse generator unit including a commutation capacitor, a voltage inverter disposed in parallel circuit relationship with respect to said capacitor to invert the polarity of a voltage charged on said capacitor, and a commutation reactor connected in series circuit relationship with at least one of said capacitor and thyristor.

2. A direct current power control system as claimed in claim 1 wherein said pulse distribution thyristors are successively fired at predetermined fixed time points while each of said main thyristors is variable in its firing time point with respect to said predetermined fixed time point of the associated distribution thyristor.

3. A direct current power control system as claimed in claim 1 wherein for each of said main thyristor, there are provided one smoothing reactor connected at one end to the cathode electrode of the main thyristor and at the other end to said load, and one semiconductor flywheel diode connected at one end to said cathode of the main thyristor and at the other end to said load.

4. A direct current power control system as claimed in claim 1 wherein said pulse generator unit includes a series combination of said commutation capacitor and said commutation reactor, and a voltage inversion thyristor connected across said series combination of capacitor and reactor, said voltage inversion thyristor including an anode electrode connected to the positive terminal of said source, and a cathode electrode connected in common to the anode electrodes of said pulse distribution thyristors.

5. A direct current power control system as claimed in claim 1 wherein said pulse generator unit includes a series combination of a voltage inversion thyristor and said commutation reactor, and said commutation capacitor connected across said series combination of thyristor and reactor, said commutation capacitor being connected at one end to the positive terminal of said source and at the other end to the anode electrodes of said pulse distribution thyristors.

6. A direct current power control system as claimed in claim 1 wherein said pulse generator unit includes said commutation capacitor, said voltage inverter disposed in parallel circuit relationship with respect to said capacitor to invert the polarity of a voltage charged on said capacitor, and said commutation reactor connected in series circuit relationship to at least one of said capacitor and thyristor and a re-charging circuit for increasing the recharging rate of said commutation capacitor.

7. A direct current power control system as claimed in claim 1 wherein said pulse generator unit includes at least said commutation capacitor, a voltage inversion thyristor disposed in parallel circuit relationship with respect to said capacitor to invert the polarity of a voltage charged on said commutation capacitor, said commutation reactor connected in series circuit relationship to either one of said capacitor and thyristor, and a recharging circuit including a series combination of a semiconductor diode and a reactor connected across said voltage inversion thyristor to increase the recharging rate of said commutation capacitor.

8. A direct current power control system as claimed in claim 1 wherein said pulse generator unit includes at least said commutation capacitor, a voltage inversion thyristor disposed in parallel circuit relationship with respect to said capacitor to invert the polarity of a voltage charged on said commutation capacitor, said commutation reactor connected in series circuit relationship to either one of said capacitor and thyristor, and a recharging circuit including a series combination of a thyristor and a reactor disposed in parallel circuit relationship with respect to said commutation capacitor to increase the recharging rate of said commutation capacitor.

9. A direct current power control system as claimed in claim 1 wherein said pulse generator unit comprises said commutation capacitor, said commutation reactor, a voltage inversion thyristor serially connected to said commutation reactor to invert the polarity of a voltage charged on said commutation capacitor, and a recharging circuit including a semiconductor diode connected in parallel circuit relationship to said voltage inversion thyristor with said diode opposite in polarity to said thyristor.

10. A direct current power control system comprising in combination
   a. a direct current source having positive and negative terminals,
   b. a load having one terminal connected to the negative terminal of said source,
   c. a plurality of main thyristors each having an anode connected to the positive terminal of said source,
   d. a corresponding plurality of smoothing reactors each connected in series between the cathode of a respective main thyristor and the opposite terminal of said load,
   e. a corresponding plurality of flywheel diodes connected in series between the cathode of a respective main thyristor and the negative terminal of said source,
   f. a pulse generator unit having an output terminal and comprising a commutation capacitor connected between the positive terminal of said source and said output terminal, a thyristor connected in parallel with said capacitor with its anode connected to said positive terminal of said source and its cathode connected to said output and a commutation reactor connected in series with at least one said thyristor and said capacitor, and
   g. a corresponding plurality of pulse distribution thyristors each having an anode connected to said output of said pulse generator unit and a cathode connected to the cathode of a respective main thyristor.

11. A direct current power control system as claimed in claim 10, wherein said pulse distribution thyristors are successively fired at predetermined fixed time points while each of said main thyristors is variable in its firing time point with respect to said predetermined fixed time point of the associated distribution thyristor.

* * * * *